(12) United States Patent
Kwan et al.

(10) Patent No.: US 11,252,192 B1
(45) Date of Patent: Feb. 15, 2022

(54) DYNAMIC SECURITY SCALING

(71) Applicant: Palo Alto Networks, Inc., Santa Clara, CA (US)

(72) Inventors: Philip Kwan, San Jose, CA (US); Sudeep Padiyar, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 304 days.

(21) Appl. No.: 16/370,201

(22) Filed: Mar. 29, 2019

Related U.S. Application Data

(60) Provisional application No. 62/738,850, filed on Sep. 28, 2018.

(51) Int. Cl.
*H04L 29/06* (2006.01)
*H04L 12/46* (2006.01)
*H04L 41/0806* (2022.01)
*H04L 41/0816* (2022.01)

(52) U.S. Cl.
CPC .......... *H04L 63/20* (2013.01); *H04L 12/4641* (2013.01); *H04L 41/0806* (2013.01); *H04L 41/0816* (2013.01)

(58) Field of Classification Search
CPC . H04L 63/20; H04L 12/4641; H04L 41/0806; H04L 41/0816
See application file for complete search history.

(56) References Cited

U.S. PATENT DOCUMENTS

| | | | |
|---|---|---|---|
| 9,306,837 B1 * | 4/2016 | Jain | H04L 45/16 |
| 9,692,727 B2 * | 6/2017 | Zhou | H04L 63/0263 |
| 10,417,454 B1 * | 9/2019 | Marom | H04L 63/10 |
| 10,708,082 B1 * | 7/2020 | Bakiaraj | H04L 41/5051 |
| 2014/0123211 A1 * | 5/2014 | Wanser | H04L 43/50 726/1 |
| 2014/0369345 A1 * | 12/2014 | Yang | H04L 12/18 370/355 |
| 2016/0142314 A1 * | 5/2016 | Parsa | H04L 41/0893 370/235 |
| 2016/0226755 A1 * | 8/2016 | Hammam | H04L 12/4633 |
| 2016/0234250 A1 * | 8/2016 | Ashley | H04L 63/105 |
| 2016/0254968 A1 * | 9/2016 | Ebtekar | H04L 41/12 709/223 |
| 2016/0315803 A1 * | 10/2016 | Sadana | H04L 41/0859 |
| 2016/0335107 A1 * | 11/2016 | Behera | H04L 69/329 |
| 2016/0337175 A1 * | 11/2016 | Rao | H04L 12/4633 |
| 2016/0359913 A1 * | 12/2016 | Gupta | H04L 43/02 |
| 2017/0099182 A1 * | 4/2017 | DeBolle | H04L 41/12 |
| 2017/0295130 A1 * | 10/2017 | Mahajan | H04L 12/4641 |
| 2017/0317901 A1 * | 11/2017 | Agrawal | H04L 43/08 |
| 2018/0007004 A1 * | 1/2018 | Basler | H04L 63/101 |
| 2018/0007007 A1 * | 1/2018 | Bansal | H04L 63/0263 |
| 2018/0062990 A1 * | 3/2018 | Kumar | H04L 45/26 |
| 2018/0063085 A1 * | 3/2018 | Shanks | H04L 63/1408 |

(Continued)

*Primary Examiner* — Blake J Rubin
(74) *Attorney, Agent, or Firm* — Van Pelt, Yi & James LLP

(57) ABSTRACT

An indication that a change implicating security in a network environment needs to be made is received. In response to receiving the indication, a first set of instructions for reconfiguring at least one network device is determined, and a second set of instructions for reconfiguring at least one security device is determined. At least one network device and at least one security device are, respectively, caused to be reconfigured in accordance with the respective first and second set of instructions.

22 Claims, 14 Drawing Sheets

(56) References Cited

U.S. PATENT DOCUMENTS

| | | | |
|---|---|---|---|
| 2018/0176145 A1* | 6/2018 | Sharma | H04L 47/726 |
| 2018/0191597 A1* | 7/2018 | Nageshappa | H04L 43/14 |
| 2018/0219877 A1* | 8/2018 | Hsu | G06F 21/62 |
| 2018/0241610 A1* | 8/2018 | Wang | H04L 12/4633 |
| 2018/0241842 A1* | 8/2018 | Kumar | H04L 67/322 |
| 2019/0020665 A1* | 1/2019 | Surcouf | H04L 9/3236 |
| 2019/0028424 A1* | 1/2019 | Mittal | H04L 61/103 |
| 2019/0158537 A1* | 5/2019 | Miriyala | G06F 21/606 |
| 2019/0182213 A1* | 6/2019 | Saavedra | H04L 63/0218 |
| 2019/0230043 A1* | 7/2019 | Kommula | H04L 47/781 |
| 2019/0230064 A1* | 7/2019 | Soman | H04L 47/20 |
| 2019/0245949 A1* | 8/2019 | Wang | H04L 69/22 |
| 2019/0280968 A1* | 9/2019 | Sreenivasagaperumal | H04L 45/16 |
| 2019/0296966 A1* | 9/2019 | Gao | H04L 45/28 |
| 2019/0364072 A1* | 11/2019 | Purusothaman | H04L 63/0281 |
| 2020/0034538 A1* | 1/2020 | Woodward | G06F 21/566 |
| 2020/0067986 A1* | 2/2020 | Didomenico | H04L 67/20 |
| 2020/0073692 A1* | 3/2020 | Rao | G06F 9/45558 |
| 2020/0382471 A1* | 12/2020 | Janakiraman | H04L 61/6013 |

* cited by examiner

DYNAMIC SECURITY SCALING

CROSS REFERENCE TO OTHER APPLICATIONS

This application claims priority to U.S. Provisional Patent Application No. 62/738,850 entitled DYNAMIC SECURITY SCALING filed Sep. 28, 2018 which is incorporated herein by reference for all purposes.

BACKGROUND OF THE INVENTION

Administrators of networks, such as enterprise networks, often manually monitor their data center security devices and deploy security policies to each appliance (e.g., a firewall) based on static information. They must configure multiple components (e.g., orchestration platforms, security management platforms, individual security devices, routers, switches, etc.) and manage protocol translations between the network fabric and the security devices to steer traffic to the right firewall to be inspected and enforced. The provisioning/configuration process can be time consuming as it is a manual process and often requires people from different functional areas (e.g., network, security, and application IT teams). A coordination requirement among such teams (e.g., with network fabrics being owned by one group, security by another, and applications by yet another group) can exacerbate the lead time in provisioning security policies correctly in the data center, and can block the ability to fine tune or balance the network and security infrastructure to keep latency low and optimize capacity. A network that is out of balance creates unwanted latency, and draining of device resources that can impact security policy provisioning and enforcement.

BRIEF DESCRIPTION OF THE DRAWINGS

Various embodiments of the invention are disclosed in the following detailed description and the accompanying drawings.

DETAILED DESCRIPTION

Figure 1A:
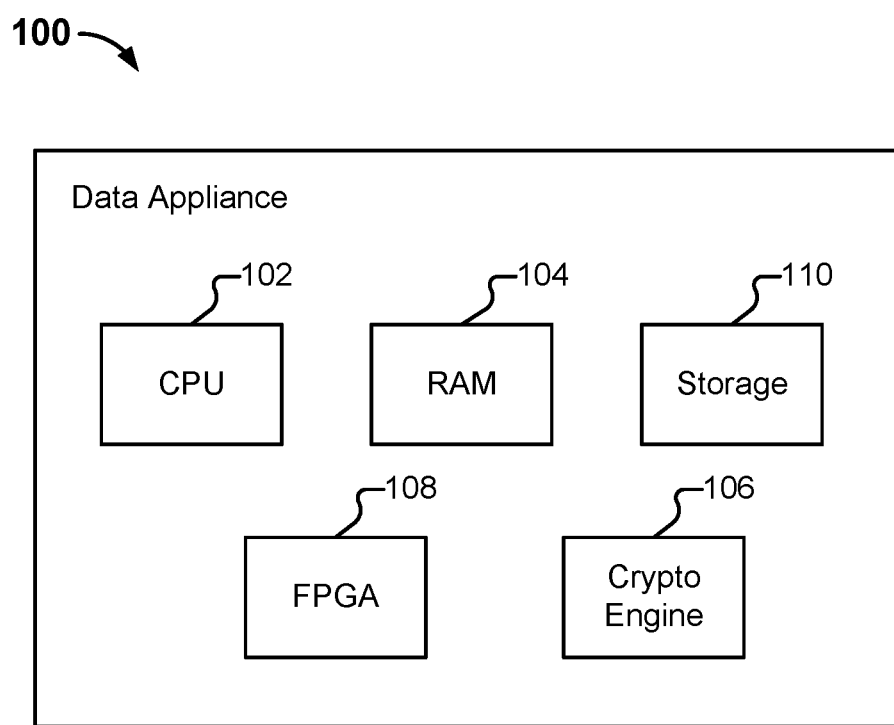
FIG. 1A illustrates an embodiment of a data appliance.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Firewall Infrastructure

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™ Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

One way of managing a firewall is by directly interfacing with the firewall (e.g., via a web interface served by the firewall appliance). Another way of managing a firewall and a more efficient way of managing multiple firewalls, such as in a data center environment, is to use a firewall management platform. One example of a firewall management platform is the Panorama™ platform for centralized device management that enables users to centrally manage a variety of tasks (including ones performed by firewalls), such as configuring network devices, deploying security policies, performing forensic analysis, and generating reports across an entire network of next-generation firewalls (e.g., available as either a virtual appliance or a dedicated management platform). Other commercially available firewall management platforms (instead of, or in addition to the Panorama™ platforms can also be used in conjunction with techniques described herein.

An embodiment of a data appliance is shown in FIG. 1A. The example shown is a representation of physical/hardware components that are included in data appliance 100, in various embodiments. Specifically, data appliance 100 includes a high performance multi-core Central Processing Unit (CPU) 102 and Random Access Memory (RAM) 104. Data appliance 100 also includes a storage 110 (such as one or more hard disk drives or solid state storage units), which can be used to store policy and other configuration information, as well as other information such as signatures and hostname/URL categorization information. In various embodiments, data appliance 100 stores (whether in RAM 104, storage 110, and/or in other appropriate locations) information used in monitoring an enterprise network and implementing disclosed techniques. Examples of such information include application identifiers, content identifiers, user identifiers, requested URLs, IP address mappings, etc.

Data appliance 100 can also include one or more optional hardware accelerators. For example, data appliance 100 can include a cryptographic engine 106 configured to perform encryption and decryption operations, and one or more Field Programmable Gate Arrays (FPGAs) 108 configured to perform matching, act as network processors, and/or perform other tasks.

Functionality described herein as being performed by data appliance 100 can be provided/implemented in a variety of ways. For example, data appliance 100 can be a dedicated device or set of devices. The functionality provided by data appliance 100 can also be integrated into or executed as software on a general purpose computer, a computer server, a gateway, and/or a network/routing device. In some embodiments, at least some services described as being provided by data appliance 100 are instead (or in addition) provided to a client device by software executing on the client device.

Whenever data appliance 100 is described as performing a task, a single component, a subset of components, or all components of data appliance 100 may cooperate to perform the task. Similarly, whenever a component of data appliance 100 is described as performing a task, a subcomponent may perform the task and/or the component may perform the task in conjunction with other components. In various embodiments, portions of data appliance 100 are provided by one or more third parties. Depending on factors such as the amount of computing resources available to data appliance 100, various logical components and/or features of data appliance 100 may be omitted and the techniques described herein adapted accordingly. Similarly, additional logical components/features can be included in embodiments of data appliance 100 as applicable. One example of a component included in data appliance 100 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 1B:
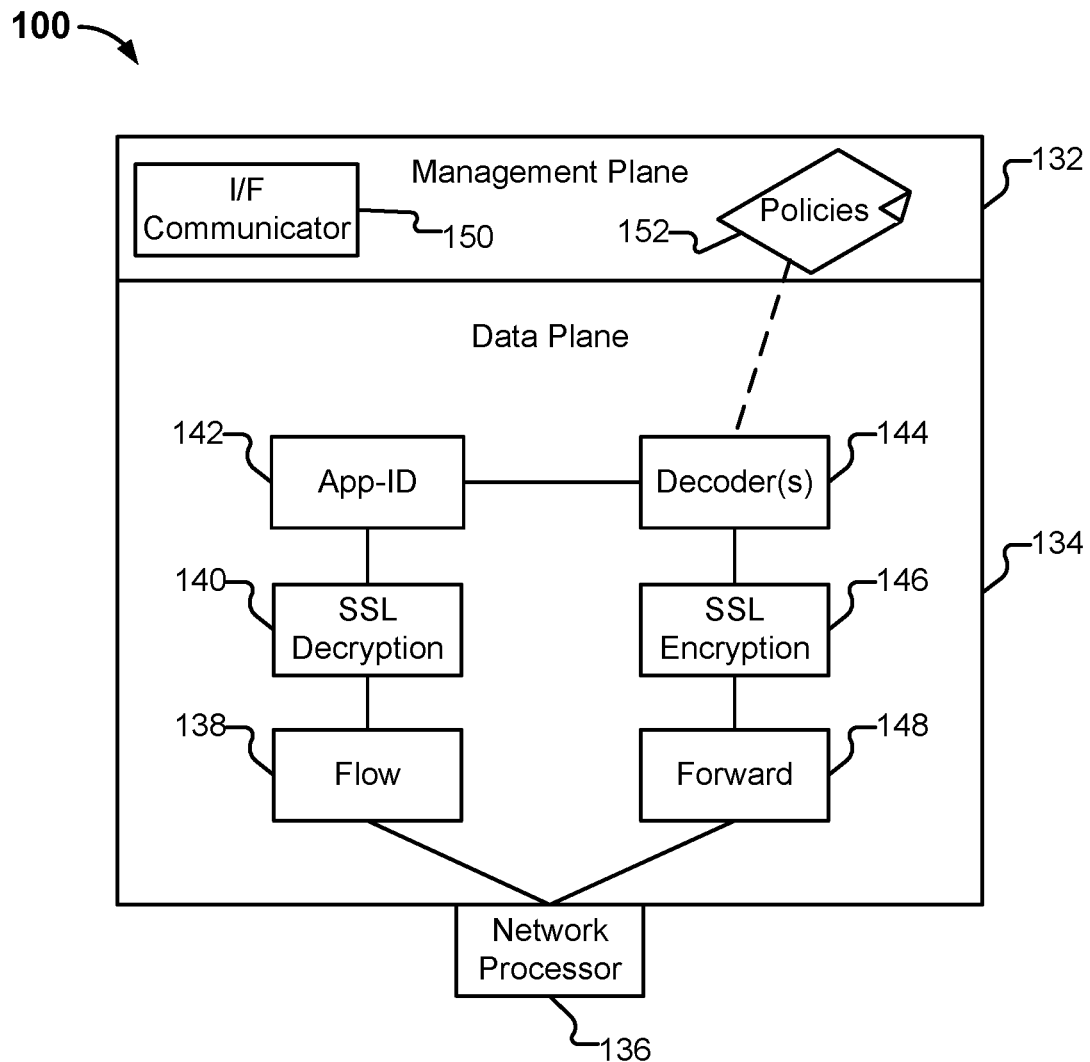
FIG. 1B is a functional diagram of logical components of an embodiment of a data appliance.

FIG. 1B is a functional diagram of logical components of an embodiment of a data appliance. The example shown is a representation of logical components that can be included in data appliance 100 in various embodiments. Unless otherwise specified, various logical components of data appliance 100 are generally implementable in a variety of ways, including as a set of one or more scripts (e.g., written in Java, python, etc., as applicable).

As shown, data appliance 100 comprises a firewall, and includes a management plane 132 and a data plane 134. The management plane is responsible for managing user interactions, such as by providing a user interface for configuring policies and viewing log data. The data plane is responsible for managing data, such as by performing packet processing and session handling.

Network processor 136 is configured to receive packets from client devices and provide them to data plane 134 for processing. Whenever flow module 138 identifies packets as being part of a new session, it creates a new session flow. Subsequent packets will be identified as belonging to the session based on a flow lookup. If applicable, SSL decryption is applied by SSL decryption engine 140. Otherwise, processing by SSL decryption engine 140 is omitted. Decryption engine 140 can help data appliance 100 inspect and control SSL/TLS and SSH encrypted traffic, and thus help to stop threats that might otherwise remain hidden in encrypted traffic. Decryption engine 140 can also help prevent sensitive content from leaving an enterprise network. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 142 is configured to determine what type of traffic a session involves. As one example, application identification engine 142 can recognize a GET request in received data and conclude that the session requires an HTTP decoder. In some cases, e.g., a web browsing session, the identified application can change, and such changes will be noted by data appliance 100. For example a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders 144. Based on the determination made by application identification engine 142, the packets are sent to an appropriate decoder 144. Decoder 144 is configured to assemble packets (which may be received out of order) into the correct order, perform tokenization, and extract out information. Decoder 144 also performs signature matching to determine what should happen to the packet. As needed, SSL encryption engine 146 can re-encrypt decrypted data. Packets are forwarded using a forward module 148 for transmission (e.g., to a destination).

As also shown in FIG. 1B, policies 152 are received and stored in management plane 132. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 150 is provided for management communications (e.g., via (REST) APIs, messages, or network protocol communications or other communication mechanisms).

II. Introduction to Spine Leaf Network Models

Demand increasingly exists for scalable networks that are robust, low latency, and easy to troubleshoot. As a result, entities are generally migrating from traditional tiered network models to full mesh spine leaf models. Unfortunately, spine leaf network designs pose various security problems over traditional tiered network models. As one example, while traditional tiered network models typically include designated, strategic, inspection points, spine leaf network designs do not offer such an inspection point that allows traffic to be scanned/enforced.

Figure 2A:
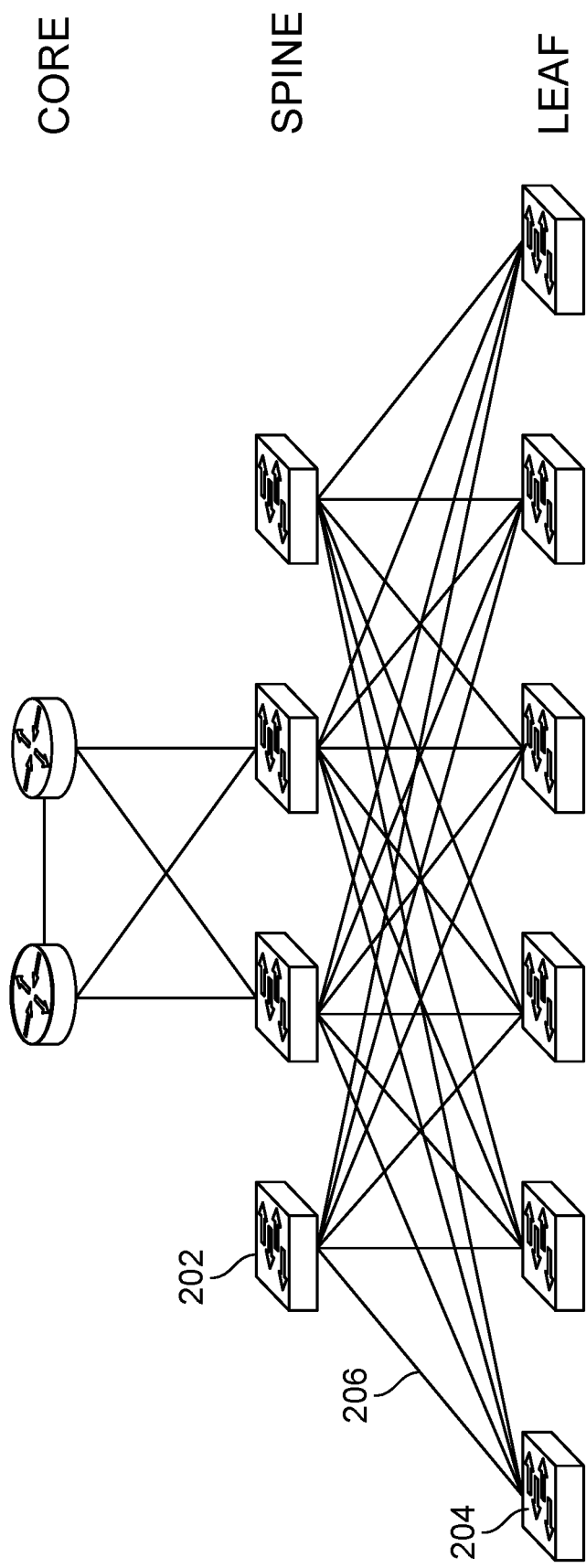
FIG. 2A illustrates an example of a full mesh spine leaf network model.

FIG. 2A illustrates an example of a full mesh spine leaf network model. The model depicted in FIG. 2A is contrasted with a traditional, legacy, multi-tiered network model in a variety of ways:

As a first example, spine leaf models are based on IP and collapse the number of tiers down to two: routers (e.g., router 202) acting as spine nodes, and top of rack ("TOR") switches (e.g., switch 204) acting as leaf nodes. As illustrated in FIG. 2A, every leaf switch is connected to every spine router (e.g., connection 206) to create a fully meshed and highly reliable fabric.

As a second example, spine leaf models are based on standardized protocols for both the control plane and the data plane and are thus multi-vendor capable.

As a third example, as there are only two tiers, spine leaf models can expand easily to allow networks to grow without adding more complexity. If the number of servers increases, an administrator can add a new rack of servers and connect those servers to a TOR switch to grow the fabric, and/or can add new spine routers without needing to make large scale changes to networking configurations on existing switches.

As a fourth example, each server connected to the TOR switch is two hops away from another server unless they are connected to the same TOR switch. This results in predictable and consistent latency and transit times across the fabric.

As a fifth example, spine leaf network models can be overlaid with software defined network ("SDN") applications that can dynamically adjust the routing of the fabric to meet routing needs instantaneously.

As a sixth example, all routes in a spine leaf network model fabric are configured in an active state resulting in efficient link usage. This can be contrasted with a spanning tree used in traditional three tier architectures.

A. Example Security Implications of Spine Leaf Network Models

One potential drawback of a spine leaf model's flexibility is that it can create challenges for security solutions that were once designed to be deployed at specific chokepoints within the network. As an example, firewalls are typically viewed as control point devices and placed in strategic locations such as at the distribution or core layer of multi-tier architectures so that traffic can be inspected without redesigning the network. Examples of such common chokepoints include: (1) Internet edge, (2) Data center edge, (3) Data center core between "like applications" for functional segmentation, (4) Campus or building edge, (5) Campus or building core, (6) Segmentation between floors, departments, groups, etc., and (7) Hair pinning traffic to physical firewalls connected to TOR for segmentation of inter-virtual machine traffic or inter-container traffic.

As security risks increase and attacks become more sophisticated, network and security administrators are increasingly designing networks to become more segmented and are placing security devices to scan traffic between each segment. Some administrators have a goal of complete device segmentation where every single device on the network is individually segmented from all other devices around them. In this approach (also referred to as micro segmentation), security functions can be integrated between each segment. For example, a firewall can be placed in between each micro segment to scan and filter traffic between every device on the network. This approach differs from the traditional security model where firewalls are placed at specific chokepoints in the network and can only see traffic that is funneled through them. In traditional security models, east-west traffic that flows between devices within the same segment is not seen by a security device (e.g., a firewall), and security risk is increased. As an example, a vulnerability in a first web server could permit access into other areas of a company's infrastructure (e.g., within a data center where sensitive consumer information is stored) and remain undetected for a long duration of time (e.g., six months).

B. Virtual Extensible Local Area Network Tunnel Endpoints

Unlike hierarchical data center models, full mesh spine leaf networks offer no traditional security inspection points that allow traffic to be easily scanned and enforced. To overlay traditional security to a spine leaf network, security devices are connected to a regular or dedicated leaf switch variously referred to as a "Virtual Extensible Local Area Network (or "VXLAN") Tunnel Endpoint" (also referred to herein as a "service VTEP") or border leaf switch.

Figure 2B:
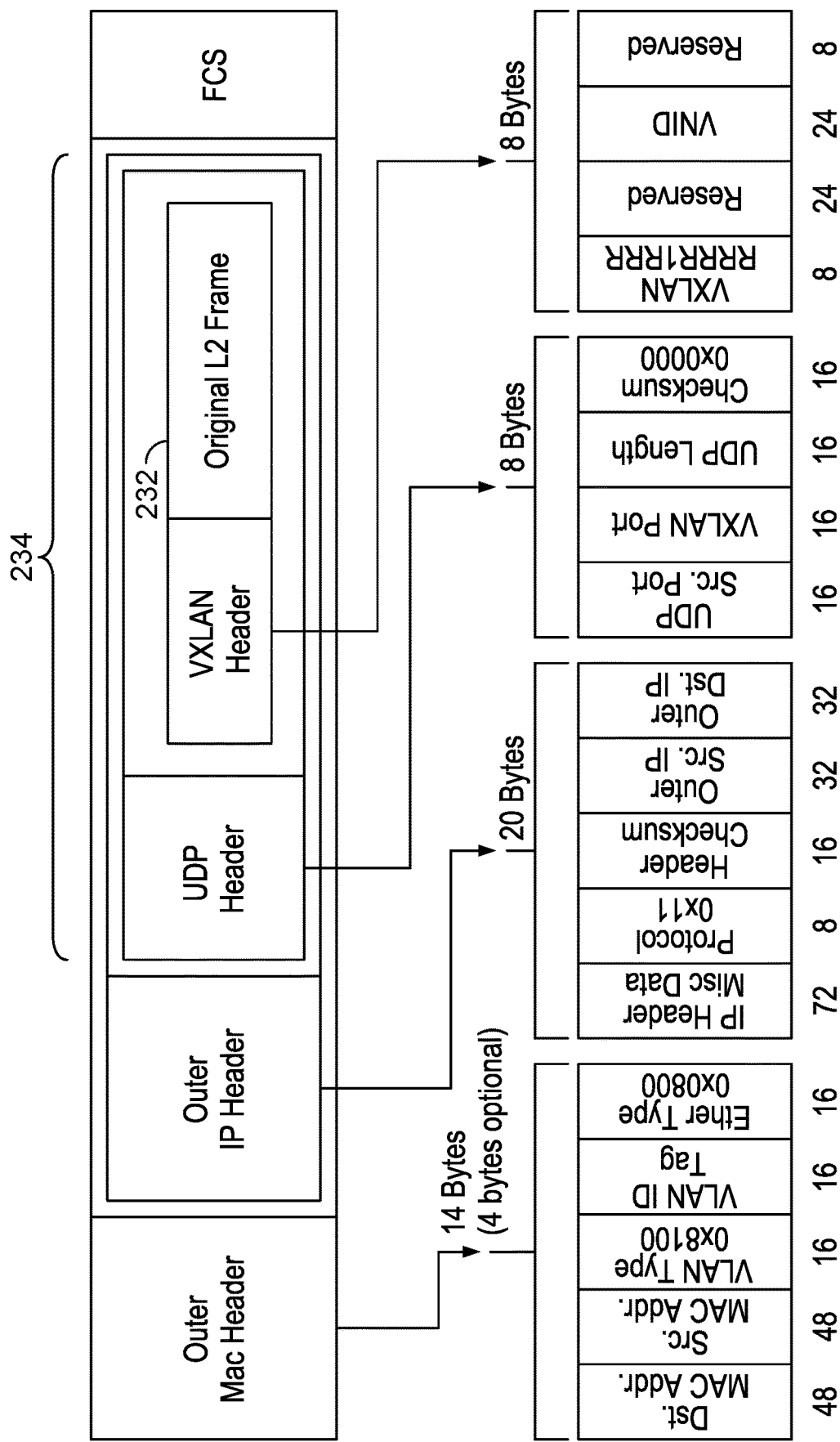
FIG. 2B illustrates an example of a VXLAN packet.

FIG. 2B illustrates an example of a VXLAN packet. A VXLAN is networking technology that encapsulates MAC-based Layer 2 Ethernet frames (232) within Layer 3 UDP packets (234) to aggregate and tunnel multiple L2 networks across an L3 infrastructure. A VXLAN Tunnel Interface ("VTI") is a switch port linked to a UDP socket that is shared with VLANs on various hosts. A VTEP is a host with at least one VXLAN VTI. A Virtual Network Identifier ("VNI") is a 24-bit number that distinguishes the various VLANs carried on a VTI. The VNI facilitates the multiplexing of several VLANs over a single VTI.

Figure 2C:
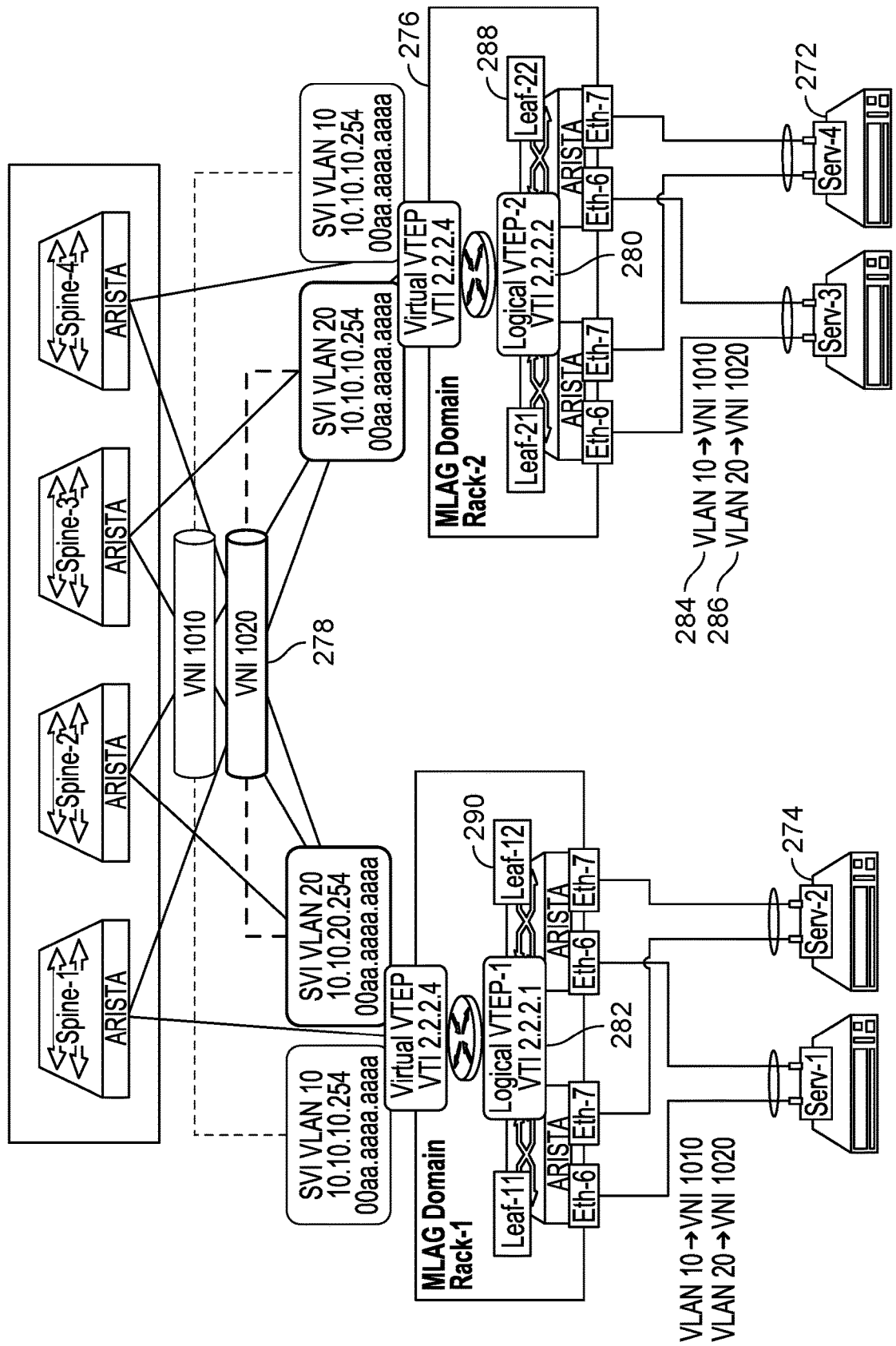
FIG. 2C illustrates an example of a spine leaf network environment with VXLAN tunnels.

FIG. 2C illustrates an example spine leaf network environment with VXLAN tunnels. In particular, a spine-leaf architecture with VXLAN overlay is depicted, where the tunnels are used to transport traffic between hosts in the same VLAN located in different leaf switches located in different areas of the network at different VTEPs. For example, in FIG. 2C, a packet from server Serv-4 (272) addressed to server Serv-2 (274) is transmitted over the VXLAN through TOR switch(es) 276 over the network with a VNI of 1020 (278) through the TOR switch(es) for server Serv-2.

Figure 3:
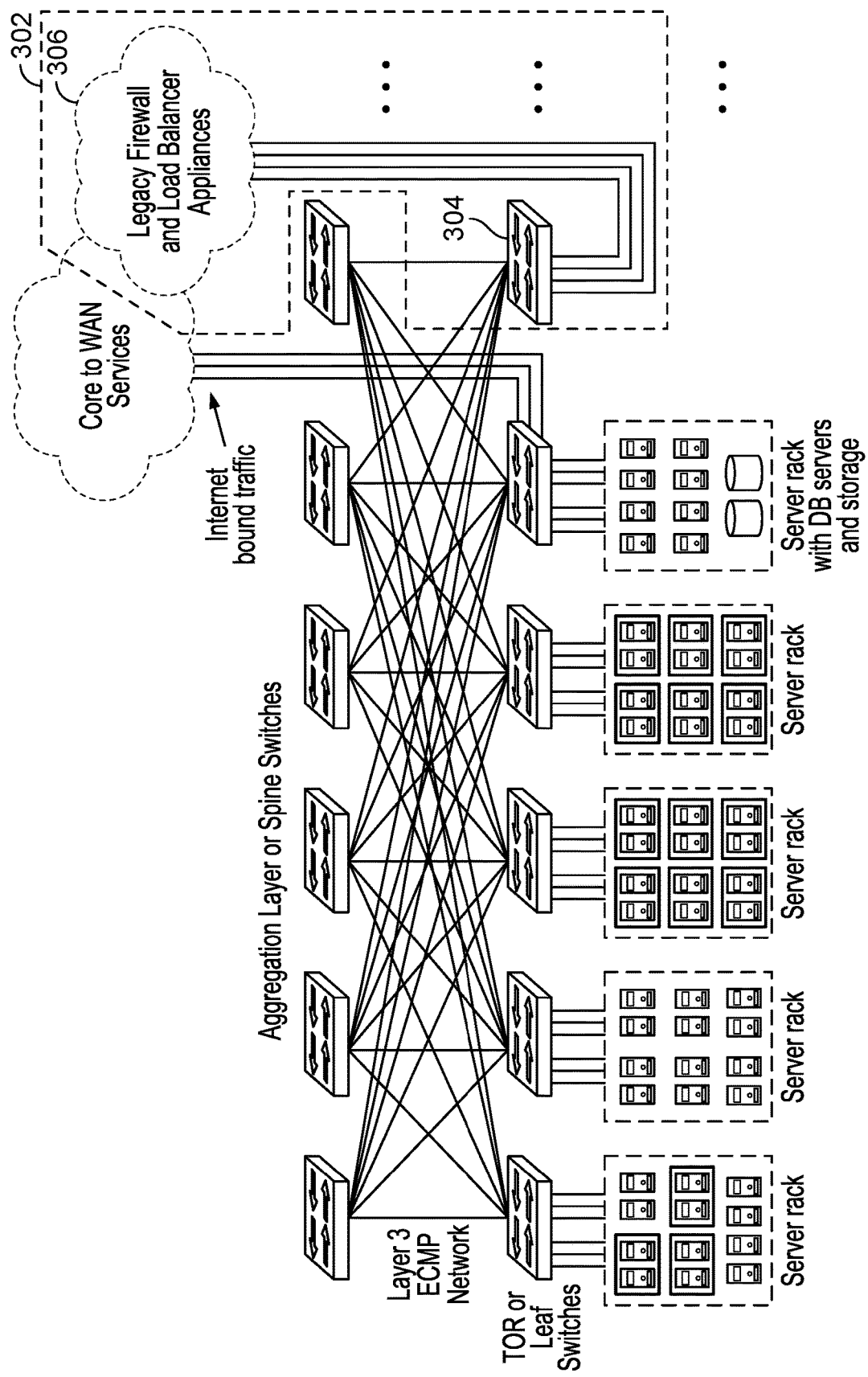
FIG. 3 illustrates a service VTEP with traditional security devices connected.

Before a firewall is introduced, the source VTEP (e.g., 280) and destination VTEP (e.g., 282) create a VXLAN tunnel and assign it a VNI (e.g., 278). Traffic from specific VLANs (e.g., 284 and 286) is mapped to the VXLAN VNI (e.g., 278) for segmentation and tunneled from source leaf switch (e.g., 288) to destination leaf switch (e.g., 290). When a security device is introduced into a spine leaf network, the traffic must be redirected from the original destination VTEP to the security device for scanning and enforcement. This can be thought of as hijacking the tunnel and redirecting it. Traffic to be scanned is steered to a "service VTEP" (302) and handed off to security device(s) as shown in FIG. 3, which depicts a service VTEP (304) with traditional security devices (306) connected.

The service VTEP must perform a protocol translation to decapsulate VXLAN tunnels that are used to redirect traffic to the service VTEP and tag the inner traffic flows with a VLAN ID. The VLAN tagged flows are then passed to the security devices for processing, as VLANs are something traditional security devices understand. This works well for traffic leaving or entering the fabric as the service VTEP or border leaf is the exit point for the traffic. Special redirection mechanisms must be built to insert the firewall for inspecting traffic going east west within the fabric though using nonstandard protocols. The VTEPs manage a VXLAN VNI-to-VLAN state table to allow security policies to be properly applied to the same VXLAN ID (VNI) every time.

Spine leaf networks with service VTEPs introduce new challenges that are not present with traditional security overlays in tiered network designs:

As a first example, redirecting traffic from the source leaf to the service VTEP is not automatic. This often requires manual configuration or some form of scripted API call from a controller which needs to keep track of all flows which need security inspection.

As a second example, the IEEE 802.1Q VLAN standard is limited to 4096 VLAN IDs. In large environments, the number of available VLANs may restrict the number of flows a security device can process.

As a third example, with only 4096 VLAN IDs, micro segmentation is often not possible as networks may have many more devices (each assigned a different VNI) than available VLAN IDs on each security device.

As a fourth example, security policies based on VLAN IDs must be associated with a VXLAN VNI. While there are 4,096 possible VLAN IDs available, there are 16M possible VXLAN VNIs. This difference can cause a need to carve out VLANs locally per firewall which map to a global list of VXLAN VNIs used on the fabric (referred to herein as "oversubscription").

As a fifth example, with the aforementioned oversubscription, security cannot scale 1:1 with the number of VXLAN VNIs added to the network. This results in additional provisioning complexities, e.g., requiring specific VXLAN VNI(s) to always be steered to a specific security device.

As a sixth example, over time, a VXLAN VNI's load can grow to the point where the security device can no longer process all its traffic in a reasonable amount of time. There is no automatic way to rebalance the traffic load to ensure the security overlay is operating at an optimal level.

As a seventh example, the VXLAN VNI-to-VLAN translation adds another layer of protocol interaction which can add unwanted latency and complexity as it requires a global entity to keep track of how the VXLAN VNIs are translated on specific firewalls which are servicing the VLAN traffic once the translation is done by the VXLAN gateway.

As an eighth example, to allow any security device to process any VXLAN VNI's traffic, all security devices in the architecture must be configured with every VXLAN VNI's security policies. This configuration is unscalable and causes inefficient use of the security device's resources.

As a ninth example, in practice, there are often multiple IT groups that manage the combined network, security, and application components. Provisioning security between multiple groups can be a challenge and can introduce delays and risk of mistakes as multiple individuals need to be involved. It is not uncommon to experience days to weeks before security policies are implemented between multiple groups.

Because of the difficulties with deploying effective, scalable security around critical resources, IT departments are lagging when it comes to scaling security solutions in their data centers. In many of the largest breaches to date, the attacker could move freely inside the data centers where critical information was kept. Without the ability to easily scale visibility and effectively detect the malicious activity, the attackers were successful. An advantage of a granular segmentation strategy is the ability to track and scan traffic between data center hosts as well as the ability to identify suspicious behavior by permitted users and devices. As attackers often use tools and applications permitted by access control lists and firewalls, the visibility gained with granular segmentation can feed advanced security components, such as network behavioral analysis, to identify abnormal activity that isn't normally seen. But before these advanced solutions can be used, the traffic must be seen first.

III. Dynamic Security Scaling

A. Introduction

Using techniques described herein (collectively referred to herein as Dynamic Security Scaling ("DSS")), multiple components (e.g., network, security, and orchestration) are integrated to minimize the time to provision security in a spine leaf network. A "single touch" provisioning technology is used that can handle the security provisioning for network traffic within a spine leaf architecture by interacting with relevant modules. In addition, DSS provides the ability to monitor critical components (e.g., routers, switches, orchestration platforms, applications, and security devices) to understand the state of the overall network. DSS also provides the ability to apply security for relevant traffic based on new attributes introduced by the VXLAN protocol such as the VNI.

DSS tracks state, resource utilization, and understands the capacity limitations of the eco-system. DSS can also be used to automatically balance and rebalance network and security devices to optimize traffic processing and security scanning operations, and ensure that the network and security eco-systems are operating at the most efficient levels at all times. DSS can also provide rich reporting, real-time status, and alerting to highlight problematic areas and inform IT staff members more security capacity should be added or rebalancing of areas of the network should take place, based, e.g., on real-time usage patterns and/or historical trends.

DSS supports bi-directional conversations among peer components (e.g., orchestration platforms, routers, switches, authentication services, applications, etc.). Further, DSS can passively learn, can actively learn by polling for information, can communicate information of its own, and/or instruct other devices (e.g., orchestration platforms, routers, etc.) to act on a trigger provided by DSS. Similarly, DSS can be instructed to act by an authorized peer if it's configured to do so.

B. Example DSS Architecture

Figure 4:
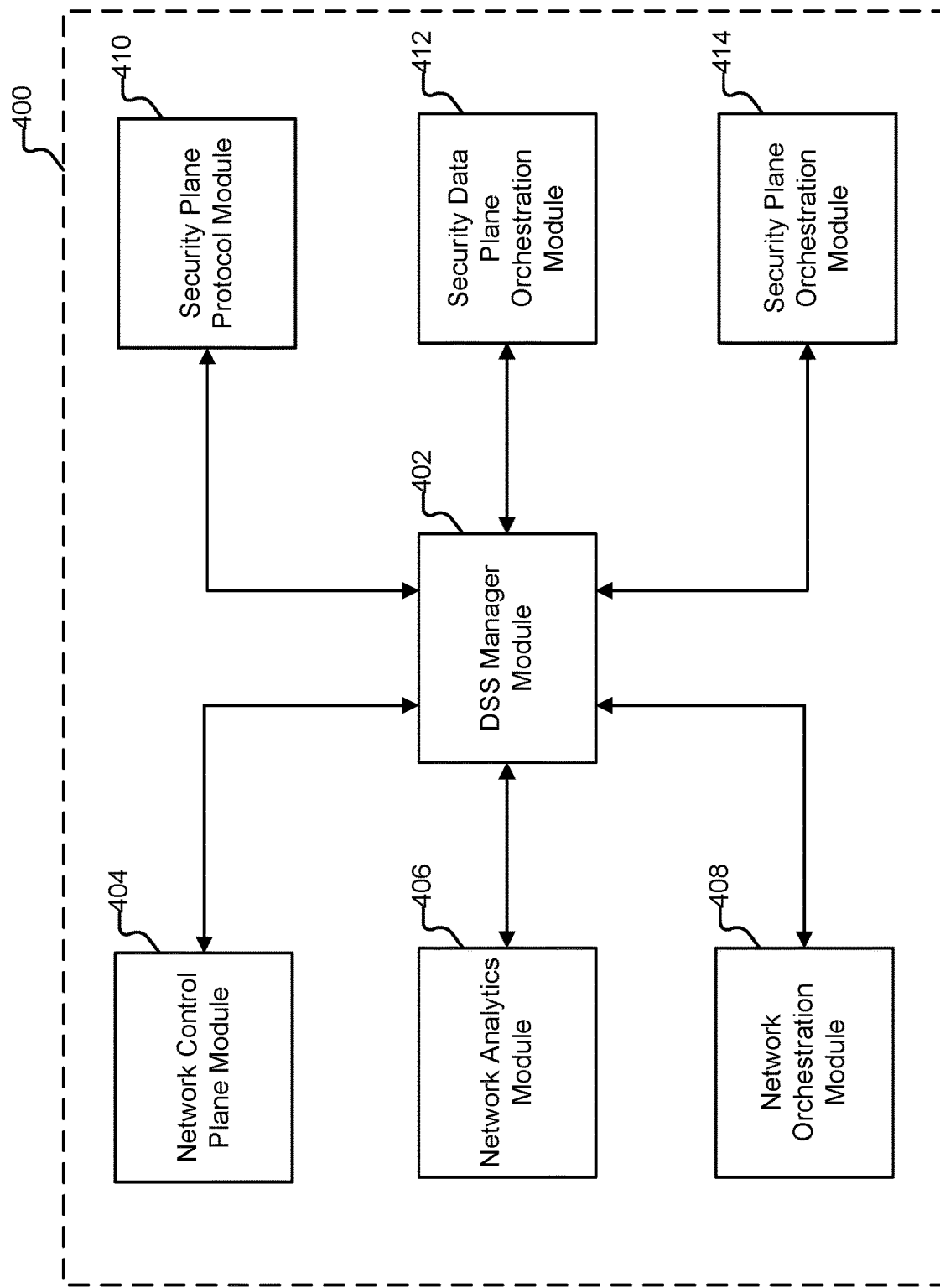
FIG. 4 illustrates an example of components which can be used to provide Dynamic Security Scaling in a spine leaf environment.

FIG. 4 illustrates an example of components which can be used to provide Dynamic Security Scaling in a spine leaf environment. Each of the modules described below can be incorporated (e.g., as software extensions written in an appropriate language) into a firewall management platform 400. A variety of firewall management platforms (and/or other infrastructure) as made by a variety of vendors can be used to implement DSS functionality. As mentioned above, one example of such a firewall management platform is Palo Alto Networks' Panorama™, embodiments of which are referred to throughout the Specification. Firewall management platforms can be implemented as a dedicated hardware platform (e.g., a server-class hardware appliance such as an M-Series appliance), as a virtual appliance (e.g., running on an ESXi server or vCloud Air), or a combination of both, as applicable. Firewall management platforms provide for centralized control of next-generation firewalls (also referred to herein, for brevity, as "firewalls"), described in more detail below.

1. DSS Central Manager Module

The DSS Central Manager Module (402) provides (e.g., via an interface provided by firewall management platform 400) a centralized way to simplify management and orchestration of DSS. Further, the DSS Central Manager Module communicates with all other DSS modules to perform and police functions. Examples of functions performed by the DSS are as follows:

Authenticating modules (e.g., 404-414) that are connected to DSS manager module 402 or to each other.

Applying policies to allow/deny activities between modules (e.g., 404-414).

Coordinating and authorizing communications and activities between modules (e.g., 404-414).

Sharing permitted information between modules (e.g., 404-414).

2. Network Control Plane Module

Network Control Plane Module 404 can be incorporated into existing routing functionality provided by a next-generation firewall. It is a component that communicates with networking components (e.g., spine and leaf modes) to learn and exchange network information to perform traffic redirection decisions. Examples of information it can handle include: (1) MAC address information, (2) IP address information, (3) VTEP location information, (4) VNI ID information, (5) device information, (6) device location, (7) network statistics, and (8) network device information.

Figure 5A:
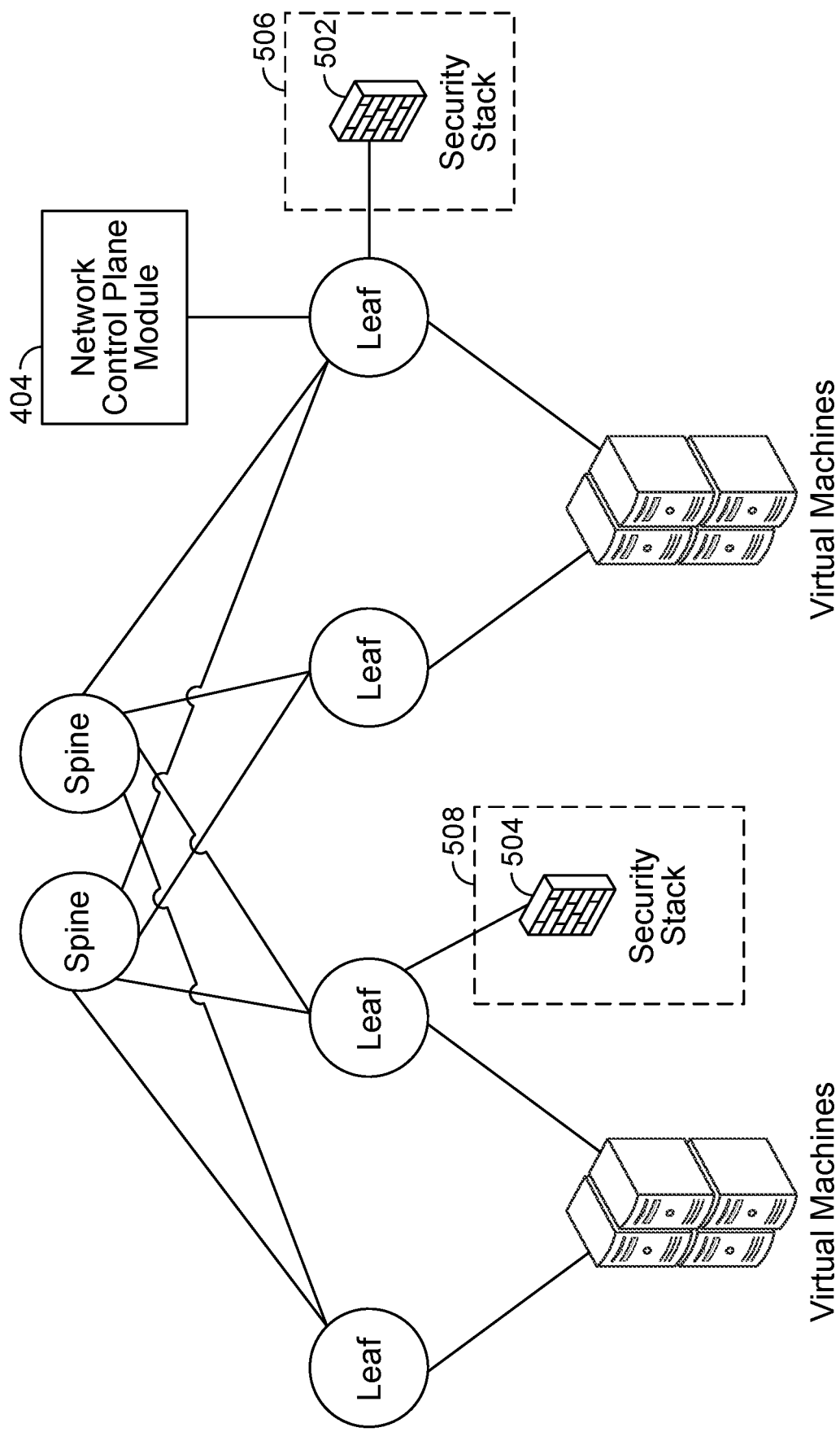
FIG. 5A illustrates an example of how a Network Control Plane Module can interact with network fabric.

FIG. 5A provides an example illustration of how Network Control Plane Module 404 can interact with network fabric. In the example shown, next-generation firewalls (e.g., running PAN-OS) are deployed into the spine-leaf fabric as service VTEPs. An example of a set of firewalls (502 and 504) acting as security VTEPs (506 and 508) to create security stacks is shown in FIG. 5A. The firewalls, deployed as stacks, can be placed anywhere in the data center.

Figure 5B:
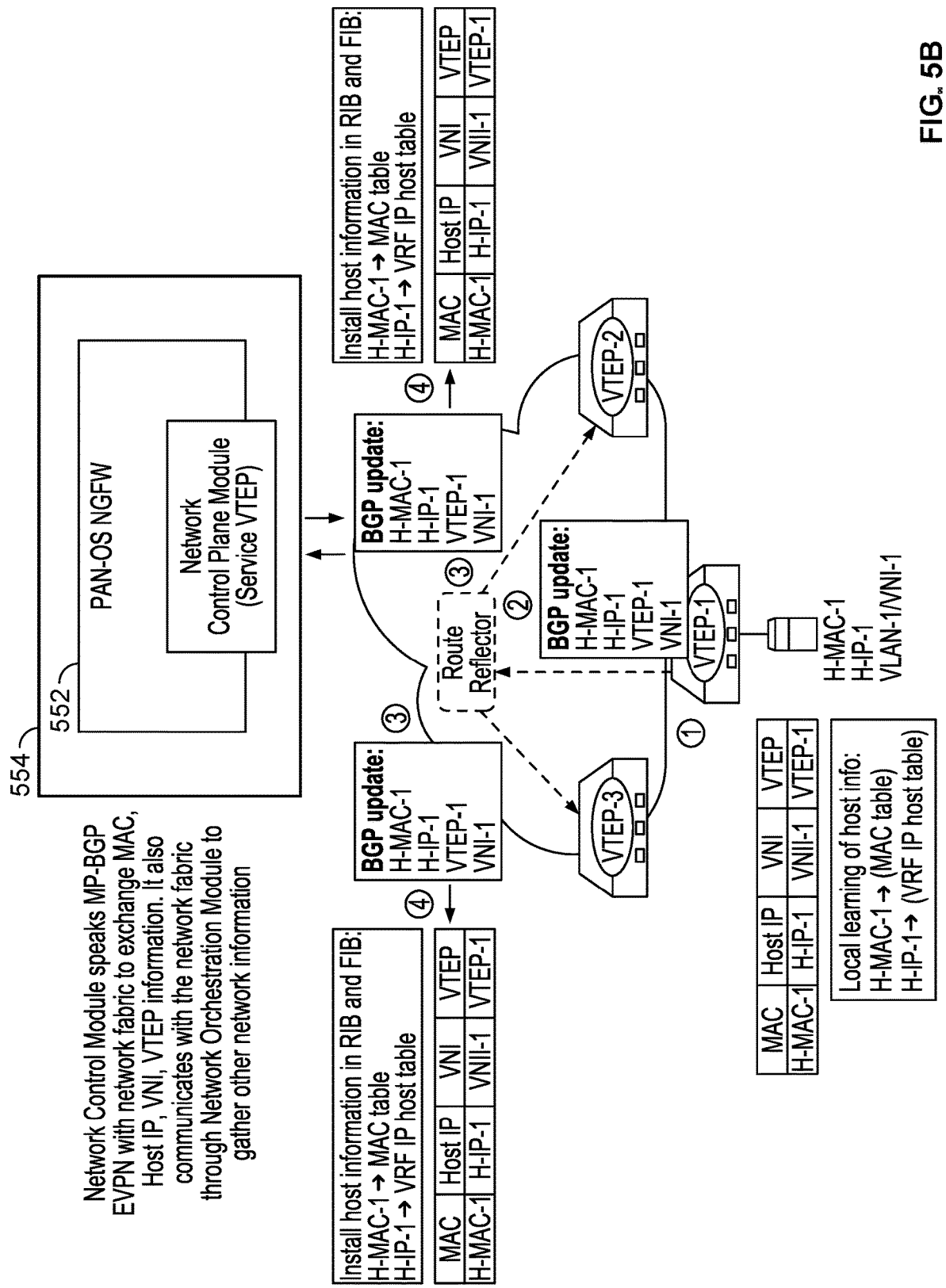
FIG. 5B illustrates a firewall exchanging information with the network fabric.

Each firewall (552) becomes part of the spine-leaf network (as contrasted with being an add-on security component that cannot exchange control information with the network fabric). Acting as a service VTEP (554), the firewall (552) exchanges MAC/Host IP/VNI/VTEP information (as shown in FIG. 5B) with the spine nodes using standards-based protocols such as RFC 7432—BGP MPLS-Based Ethernet VPN. The firewall will appear like any another leaf node to the spine nodes. And, the spine nodes can be provided by any vendor (e.g., Cisco, Arista, Juniper, or other networking vendor).

Along with Network Orchestration Module 408, Network Control Plane Module 404 can also extract additional information from the network fabric that can play a role in security classification and traffic handling. For example, if hosts are throttling the network at a high packet-per-second rate, the implicated packets can be redirected to the security stack for scanning, throttled, or blocked from the network based on a set of security and/or behavioral policies. Network Control Plane Module 404 provides a two-way information exchange between the security platform and the network fabric components.

3. Network Analytics Module

Figure 6:
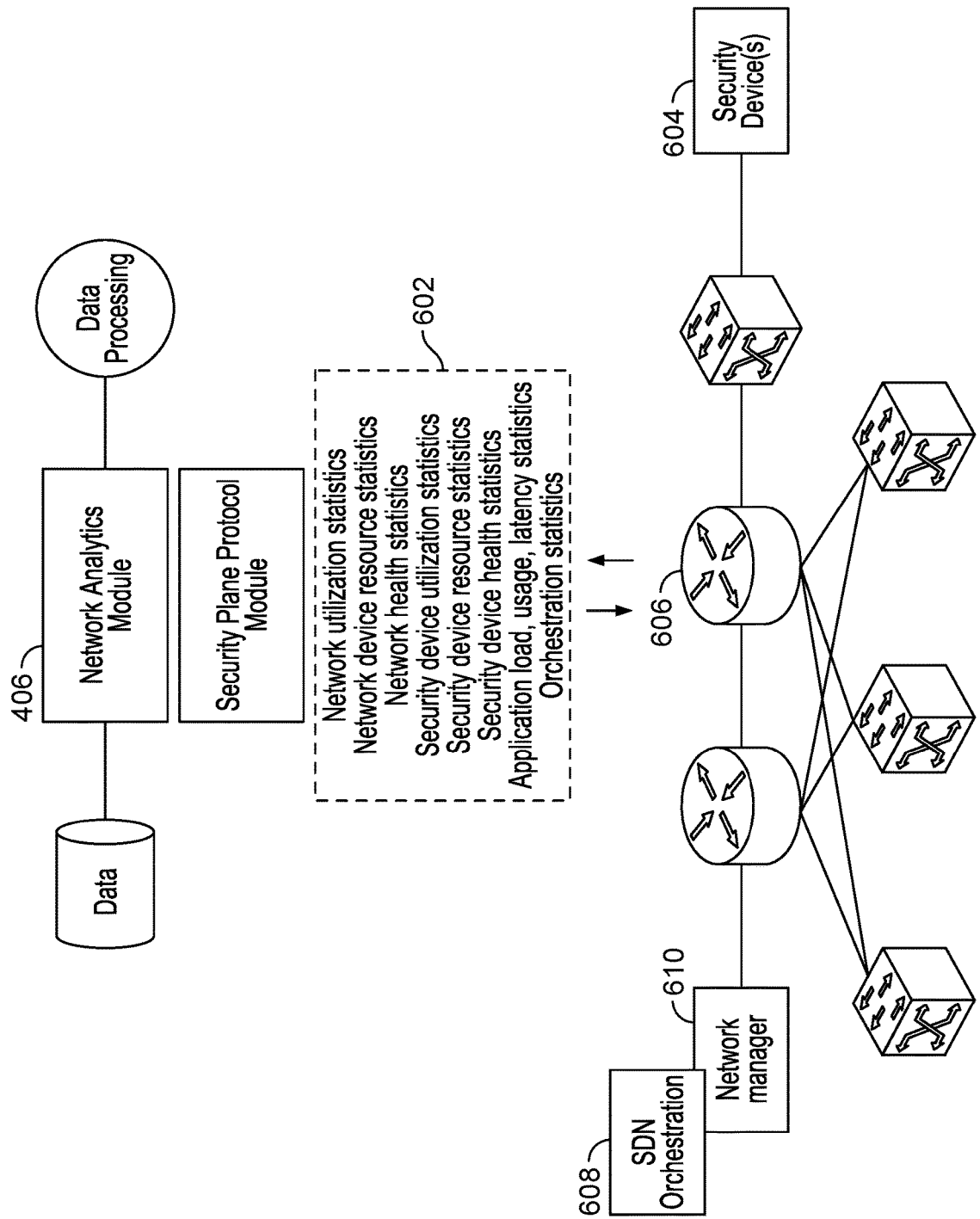
FIG. 6 illustrates a Network Analytics Module gathering and analyzing network security, application, orchestration, and other information.

Network Analytics Module 406 is a component that provides key decision-making information to the DSS Manager Module within Panorama. This module provides visibility into the network fabric and security overlay for Panorama to make orchestration and fabric load balancing decisions. As shown in FIG. 6, Network Analytics Module 406 gathers and analyzes network information (e.g., collected from networking component 606 or network manager 610), security information (e.g., collected from security device(s) 604), application information (collected as applicable), orchestration information (e.g., collected from 608), and other information. Examples of information (e.g., 602) that the Network Analytics Module can gather and analyze include: (1) network utilization (bandwidth, packets per second, connections per second), (2) network statistics, packet size break down, etc., (3) network health, network and latency, (4) security device utilization (bandwidth, packets per second, connections per second), (5) security device statistics (policy, object usage and capacity), (6) security device resource utilization and health, (7) application usage, load, latency, (8) orchestration statistics, and (9) orchestration latency.

Network Analytics Module 406 is an important component for measuring efficiency of the data center fabric. The overall performance of the data center hinges on latency at different points of the network, such as TOR switches, spines, firewalls, network taps etc. Network Analytics Module 406 gathers the utilization information from each of these devices and feeds the collected network analytics information to the Network Orchestration (408) and Security Orchestration (412, 414) modules, so they can determine how to rebalance the fabric for the existing topology and flows as well as to handle new application flows which come up dynamically within the data center.

In addition to modules 408, 412, and 414, the network analytics information can be propagated up to network orchestrators (e.g., Cisco API Controller, and NSX Manager) and relayed to security orchestrator modules (e.g., as running in Panorama). Example ways for relaying the statistics include traditional mechanisms (e.g., SNMP and NetConf) and new REST API based infrastructure which can be used by any generic consumers of the statistics.

4. Network Orchestration Module

Network Orchestration Module 408 is a component that ties into Panorama to give it the ability to either configure the network components itself, or to pass instructions to external network software-defined network ("SDN") overlays to make the network changes. The Network Orchestration Module communicates with networking components (e.g., routers, switches, network management systems, orchestration platforms, applications, etc.) to control network steering functions. Examples of such functions include: (1) redirecting traffic to the security components, (2) redirecting the path traffic takes from source to destination, (3) blackholing traffic by steering it to a loopback address, (4) splitting traffic flows to optimize bandwidth or to scale bandwidth, (5) creating, deleting, or altering layer 3 path information in route/forwarding information base, (6) creating, deleting, or altering layer 2 address tables—MAC, ARP, etc.

Figure 7:
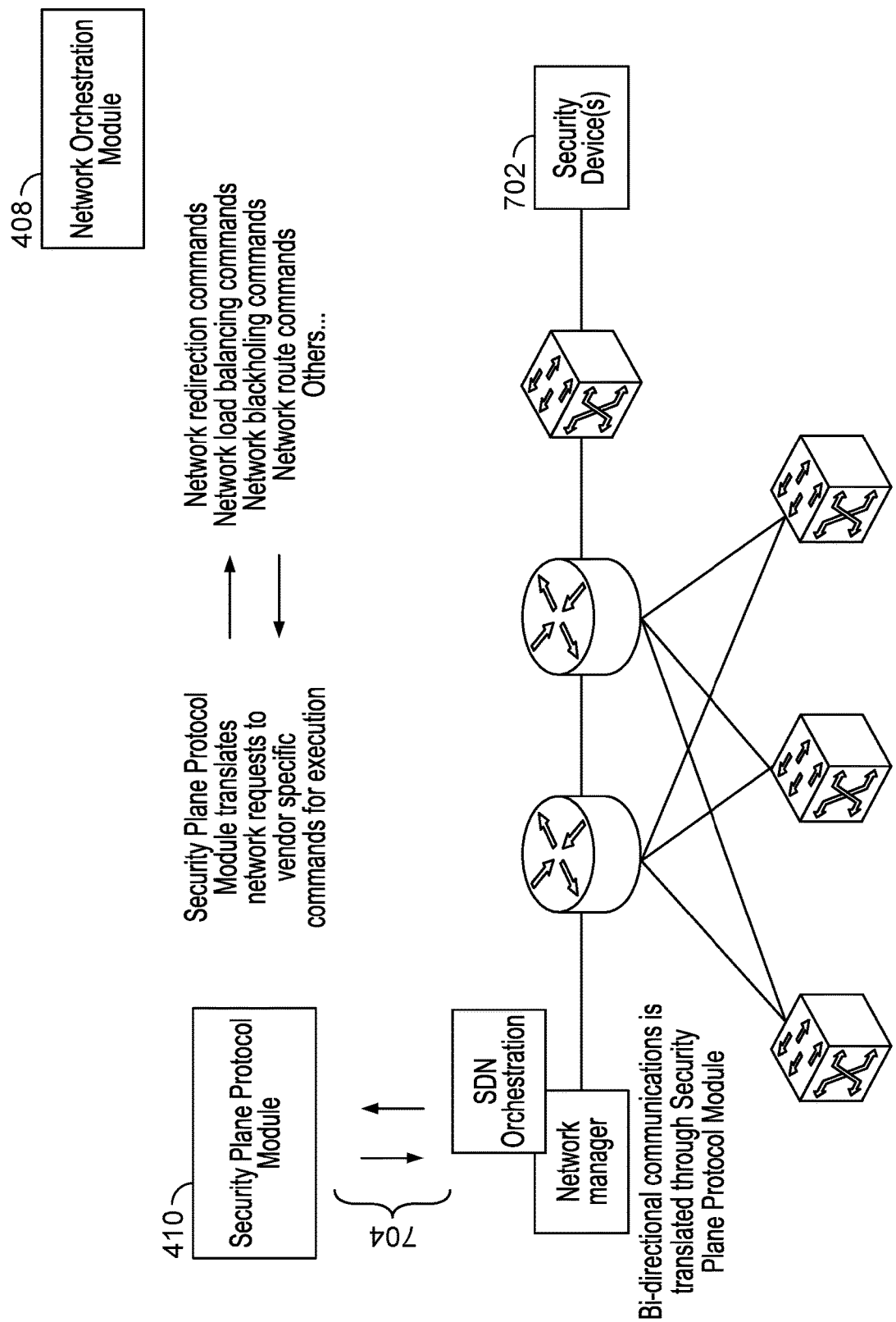
FIG. 7 illustrates an example of how a Network Orchestration Module can interact with network fabric through a Security Plane Protocol Module.

FIG. 7 illustrates an example of how the Network Orchestration Module (408) can interact with the network fabric through the Security Plane Protocol Module (410). Security Plane Protocol Module 410 provides multi-vendor support through a translation plugin that provides the translation between vendors' orchestration and/or management platforms and Network Orchestration Module 408. DSS Manager Module 402 can redirect traffic by reconfiguring the network fabric automatically (or manually if customer prefers) through configuration commands to routers, switches, or other network devices through vendor specific plugins controlled by Security Plane Protocol Module 410.

Change confirmation is communicated back to Network Orchestration Module 408 to inform the DSS Manager Module 402 whether commands are successful or not. Security Plane Protocol Module 410 provides a two-way communication path (704) between the network fabric and the security platform (702).

5. Security Plane Protocol Module

Security Plane Protocol Module 410 is a component that ensures that security and network orchestration can be harmonized to provide consistent workflows for security and network administrators. Different entities (e.g., the fictional company ACME and the fictional company Beta) will deploy switches and controllers from different vendors (e.g., Cisco Nexus, Arista, and HP) in their respective enterprise networks. Security Plane Protocol Module 410 provides a vendor agnostic way to provision security, allowing Security Plane Orchestration module 414 to communicate with other modules like Network Orchestration module 408 in a standardized way.

Figure 8:
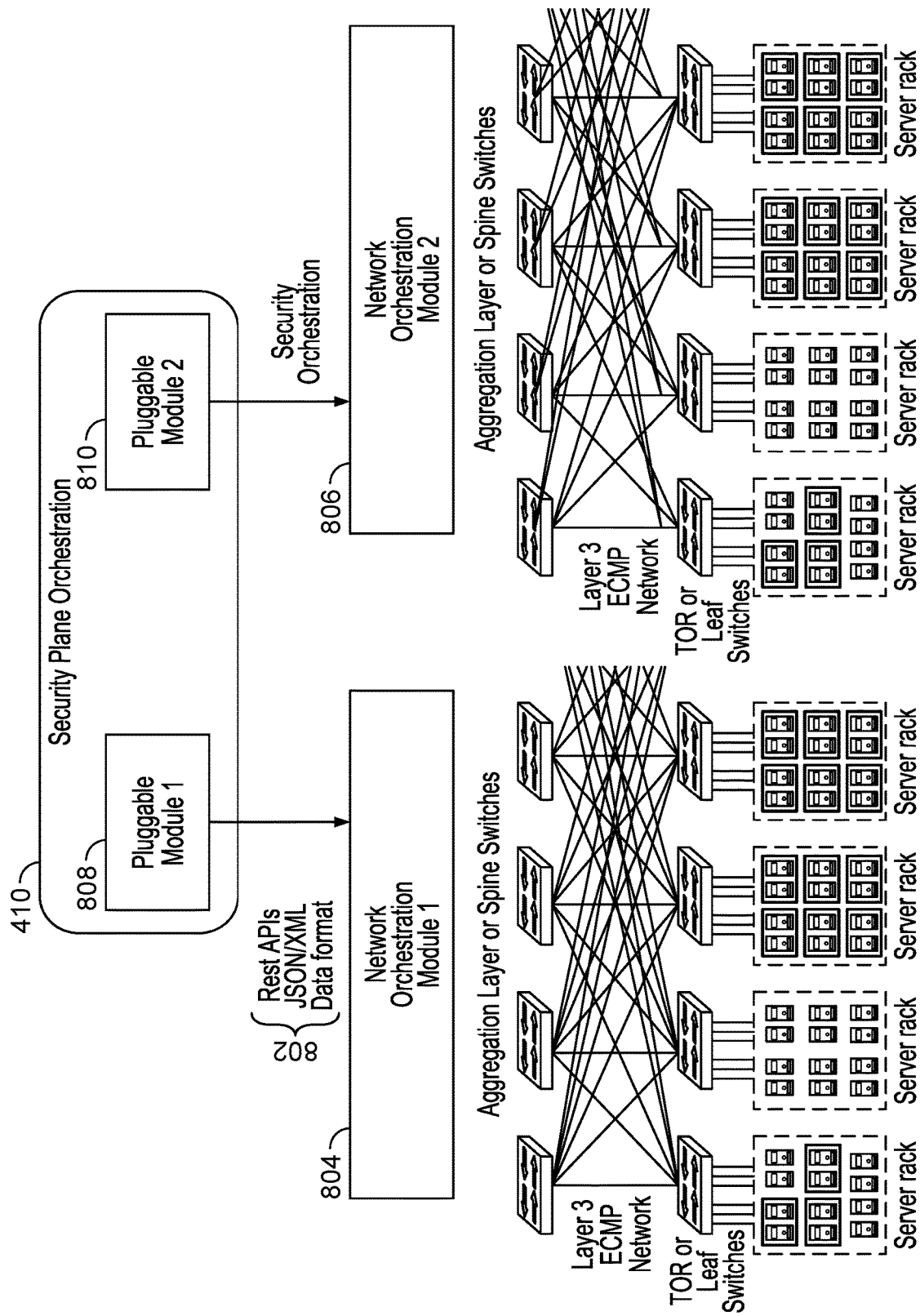
FIG. 8 illustrates a Security Plane Orchestration Module as a pluggable module.

As illustrated in FIG. 8, in various embodiments, Security Plane Protocol Module 410 is a pluggable module (embodiments of which are shown as module 808 and module 810) which manages the overall orchestration flow and can be incorporated into the security plane orchestration module. One example function that can be provided by the Security Plane Protocol Module is configuration provisioning on Network Orchestration Module 408 and Network Analytics Module 406 using standard mechanisms such as REST APIs using XML and JSON schemas (802). Different entities (e.g., ACME and Beta) will use switches and controllers from different vendors, and some of entities will also have a hybrid mix of TORs from one vendor and spine switches from a different vendor. Likewise, different entities (e.g., vendors) will have their own Network Orchestration Modules (e.g., 804 and 806, which are embodiments of Network Orchestration Module 408) supporting different protocols, schemas, workflows, data exchange formats, and APIs. Security Plane Protocol Module 410 provides a mechanism to provision security in a vendor agnostic way (via the plugin architecture) bringing the flexibility of building specific integrations with different hardware configurations. Security Plane Protocol Module 410 further provides for standard workflows based on security administrator requirements, and allows functions to be developed with specific customizations on a case by case basis via the pluggable module. Further, the pluggable module can include north bound APIs (which can, e.g., be used by Ansible or Terraform templates for end to end automation).

6. Security Data Plane Orchestration Module

Security Data Plane Orchestration Module 412 communicates with security components (e.g., next-generation firewalls, IPS devices, DDoS devices, load balancers, network sensors, application brokers, etc.) to control data plane activities to perform specific functions. For example, this module can enable and disable security functions dynamically (as data center workloads change), based on events occurring learnt from the applications running in the data center. Other examples of functions the Security Data Plane Orchestration Module can perform include: (1) provisioning/deprovisioning security policies, (2) creating/deleting objects, (3) allowing/blocking traffic, (4) rewriting VLAN, VNI, and security tags, (5) creating VXLAN tunnels to forward traffic, (6) routing traffic between VXLAN VNIs, (7) redirecting traffic flows to a different destination, (8) redistributing traffic flows, and (9) load balancing traffic flows.

7. Security Plane Orchestration Module

Security Plane Orchestration Module 414 is a component that communicates with data center orchestration tools (e.g., Chef, Puppet and Ansible) to provision security across the network fabric in a fully automated way. One way to implement Security Plane Orchestration Module 414 is as a set of extensible modules/plugins to Panorama, which can manage individual interactions with orchestration components.

The orchestration for security provisioning and interacting with the network orchestration and analytics modules can be handled within management platforms for firewalls by adding extensible modules in it. Examples of functions that can be provided are as follows:

Lifecycle orchestration of the firewall appliances, including virtual firewalls.

License and software management of the firewall devices.

Provisioning of security policies to the relevant firewalls which will secure traffic for specific tenants and flows which will be dynamically set up.

Providing relevant metrics and attributes to the network orchestration module so that traffic which has been determined to need security scanning is redirected to the relevant firewall.

Enabling security administrators to determine the level of security needed for specific workloads regardless of where they are connected in the fabric.

Performing mapping of tenant information to the networking layer and provisioning tenant specific security policies to the relevant firewalls which will inspect traffic for the specific tenants.

Further, Security Plane Orchestration Module 414 can take input from Network Analytics Module 406 and perform tasks such as:

Rebalancing the network load to load balance new traffic flows to relevant firewalls based on the parameters exposed on security device statistics and utilization.

Provisioning security policies on security devices to ensure traffic flows are properly scanned.

Splitting up resource intensive VNIs to distribute traffic that previously went to one security device to multiple security devices.

Figure 9:
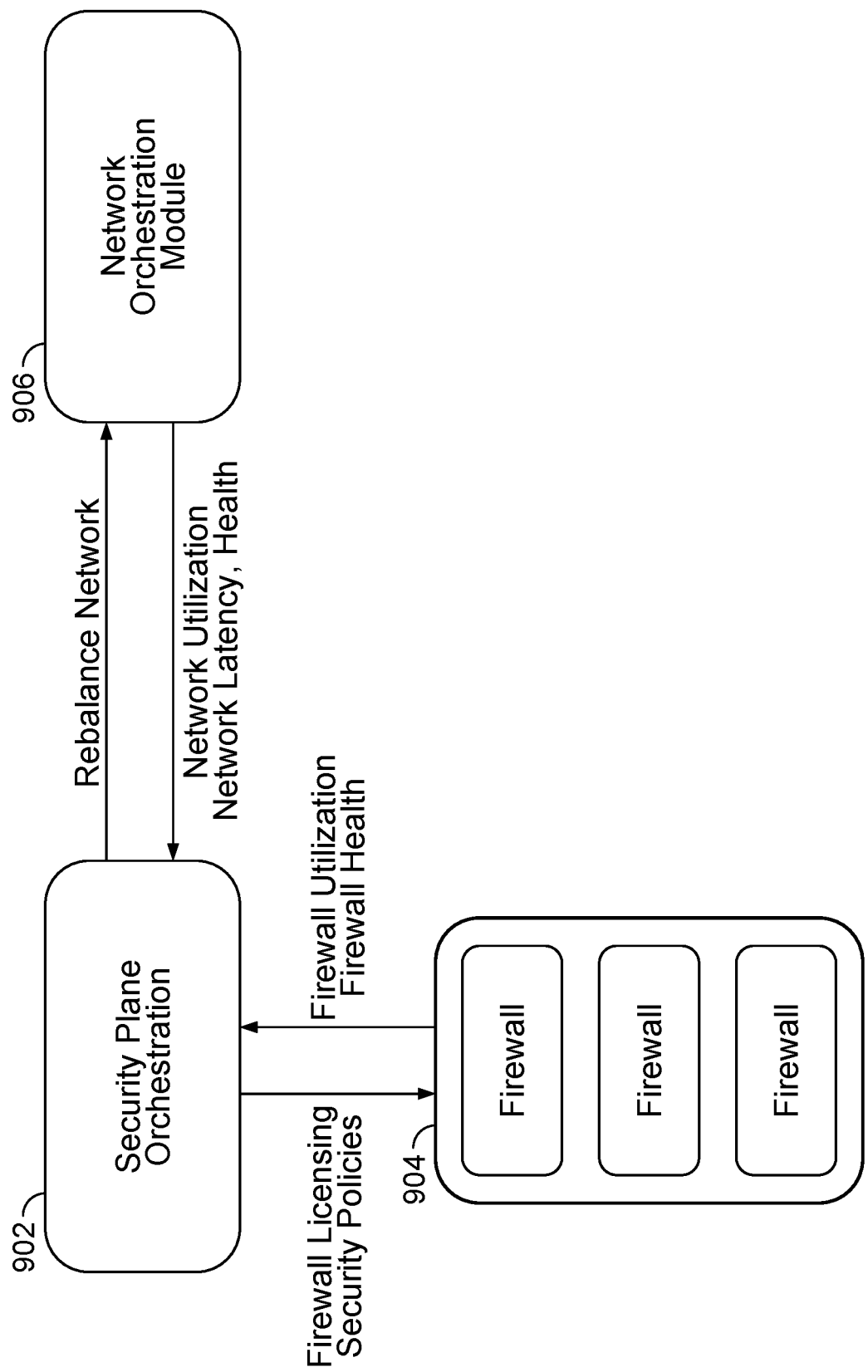
FIG. 9 illustrates an example of a Security Plane Orchestration Module managing firewall hardware in a security stack.

FIG. 9 illustrates example ways that a Security Plane Orchestration Module interacts with various components of platform 400. Security Plane Orchestration Module 902 is an embodiment of Security Plane Orchestration Module 414 and is implemented, e.g., as a module of Panorama. Module 902 communicates licensing information and security policies to firewalls (e.g., physical and/or virtual firewalls 904). Firewalls 904 communicate utilization and health information to Module 902.

Network Orchestration Module 906 (an embodiment of Module 408 using, e.g., Arista CloudVision, Cisco APIC, VMWare NSX Manager, or Nuage Networks Virtualized Services Directory) provides Security Plane Orchestration Module 902 with network utilization, latency, and health information. Security Plane Orchestration Module 902 provides Network Orchestration Module 906 with network rebalancing instructions.

An example configuration flow between Security Plane Orchestration Module 902 and Network Orchestration Module 906 is as follows. First, Security Plane Orchestration Module 902 initiates a security workflow to Network Orchestration Module 906. The optimal firewall is selected by Security Plane Orchestration Module 902 based on network and firewall metrics (described above). The selected firewall information and tenant name are sent to Network Orchestration Module 906. Next, Network Orchestration Module 906 returns specific VXLAN attributes (e.g., VNI, VTEP ID) to map the tenant's network prefix with tenant attributes. Finally, Security Plane Orchestration Module 902 sends a confirmation to Network Orchestration Module 906 and both modules provision respective components.

C. Example DSS Workflows

Figure 10:
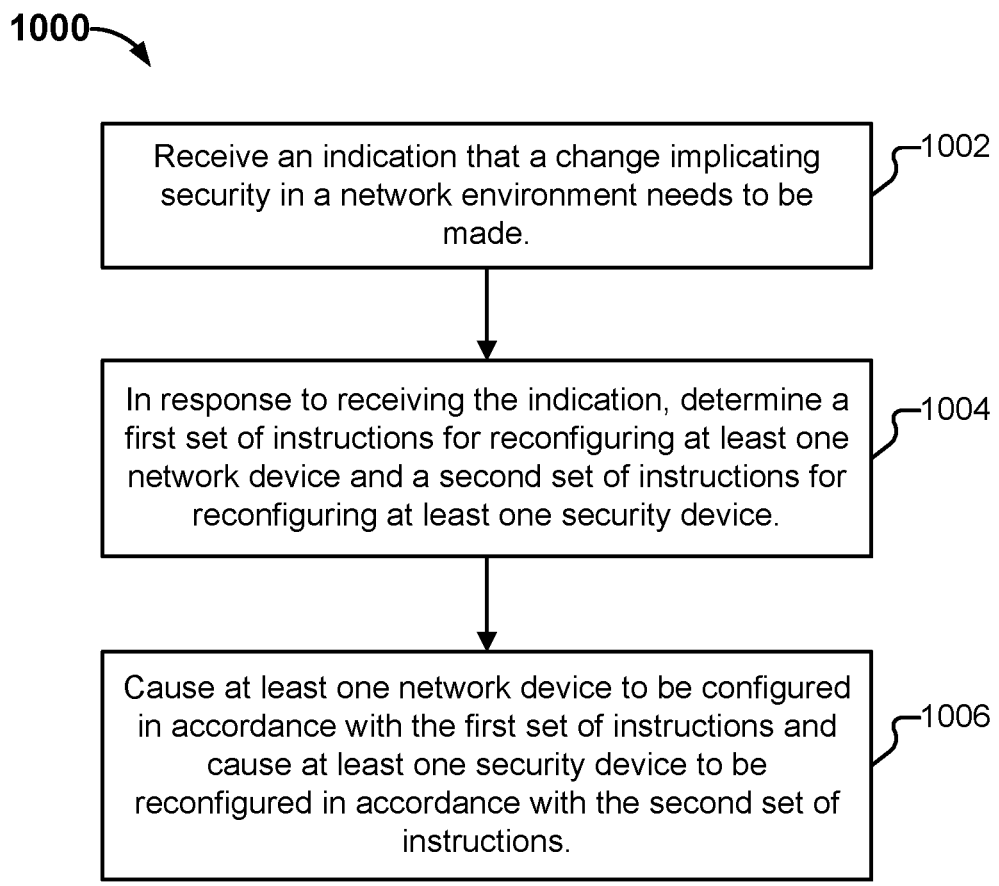
FIG. 10 illustrates an embodiment of a process for using Dynamic Security Scaling in a network environment.

FIG. 10 illustrates an embodiment of a process for using Dynamic Security Scaling in a network environment. In various embodiments, process 1000 is performed by DSS Manager Module (402), for example, as implemented within a firewall manager such as firewall manager 400.

Process 1000 begins at 1002 when an indication that a change implicating security in a network environment needs to be made is received. As one example, an indication is received at 1002 in response to a provisioning event (e.g., a new application is provisioned in a network, content scanning is required between hosts residing in separate TOR (VTEP) switches, etc.). As a second example, an indication is received at 1002 in response to overutilization of a device (e.g., a network device or firewall). As a third example, an indication is received at 1002 in response to the addition of a new security device to the network.

At 1004, a determination of a set of instructions for reconfiguring network devices, and a set of instructions for reconfiguring security devices is performed. Various examples of determining such instructions are described throughout the Specification, including below in which three example workflows are provided.

At 1006, at least one network device and one security device are caused to be reconfigured. As one example, Network Control Plane Module 404 can provide (re)configuration instructions to a network device. Various examples of network and security device reconfigurations are described throughout the Specification, including below in which three example workflows are provided.

1. Security Provisioning Use Case

This example security policy provisioning use case illustrates how orchestration can originate from DSS Manager Module 402 to simplify provisioning between various networking and security components. It highlights how use of DSS reduces the need to provision the network and the security components separately.

1: An administrator needs to provision a new application in a network. The application needs to be scanned by the security platform if it moves between leaf switches or out of the data center.

2: The administrator logs into platform 402 to begin the configuration.

3: The administrator creates security objects and policies for the new application. When the security rules are ready to deploy, DSS Manager Module 402 consults Network Analytics Module 406 to see which firewall is least used. Network Analytics Module 406 understands each security and network component's utilization history and tells DSS Manager 402 which firewall is optimum to handle the new application's security requirements.

4: DSS Manager Module 402 uses Security Plane Protocol Module 410 and Security Orchestration Modules 412 and 414 to push the security policies, objects, profiles, etc. to the assigned firewall.

5: Security Plane Protocol Module 410 ensures that the security policies are correctly provisioned on the firewall by instructing the network fabric to test the network path between the source and destination.

6: The firewall is connected to the network fabric as a service VTEP and uses Network Control Plane Module 404 to exchange control information with the spine nodes. Through its conversations with the network fabric, the firewall has a full understanding of where every host resides in the data center. The firewall has the MAC address of every host and which leaf node (VTEP) that host resides under. It creates a MAC/VTEP/IP mapping for every host learned. Network Control Plane Module 404 keeps this information up to date and understands changes to the host and its location in real time.

7: After positive confirmation that the security policies are properly provisioned, and the path is valid, DSS Manager 402 calls Network Orchestration Module 408 to provision the necessary network configuration to redirect traffic from the source VTEP to the firewall that was provisioned with the new application's security policies. The reverse path from the destination VTEP to the source VTEP is also intercepted to ensure that return traffic between the hosts is inspected by the firewall too. DSS Manager 402 calls Network Orchestration Module 408 to provision the network configuration to redirect traffic from the destination VTEP to the same firewall.

8: When the source/destination hosts send application traffic, the flow crosses their respective leaf nodes (VTEPS). Using a client to server flow as an example, when the source host sends traffic to the destination host, the flow will traverse the client's leaf switch (source VTEP). The source VTEP creates a VXLAN tunnel to forward the flow to the destination host. The VXLAN tunnel ensures that the two hosts can reside in different locations of the data center and reside in the same layer 2 network (subnet).

9: The redirection configuration provisioned at 7 above intercepts the VXLAN tunnel and redirects it to the firewall instead of the true destination VTEP where the destination host (server) resides. The redirection highjacks the VXLAN tunnel and steers it to the firewall acting as the man-in-the-middle device.

10. The firewall terminates the VXLAN tunnel and inspects the inner flow(s) and enforces the security policies that were provisioned at 4 above.

11. Once inspected (and if not dropped or blocked), the firewall uses the MAC/VTEP/IP map learned at 6 above to look up the destination VTEP (leaf node) where the destination host resides.

12. The firewall creates a new VXLAN tunnel with the appropriate headers on the egress data plane interface and tunnels the inspected traffic to the destination VTEP that contains the destination host. The firewall acts as a VXLAN proxy in this use case as it terminates the original tunnel and forms a new proxied tunnel to complete the flow path to the destination host.

13. The destination VTEP receives the VXLAN tunnel from the firewall, terminates it, and sends the inner contents to the destination host.

14. The return traffic from the server to the client takes the opposite path and its flow is intercepted by the firewall for inspection through the redirection command provisioned on the server's VTEP at 7 above.

2. Security Load Distribution Use Case

One of the challenges DSS solves is the ability to scale security services without manual intervention. Without DSS, customers would need to monitor network and security component resources to understand which components were over/under utilized. When components are over utilized, high latency or dropped packets is incurred which can be very disruptive to critical applications and business functions. Network and security administrators would have to monitor the platforms, identify overloaded components, plan which items to move (rebalance) between components, schedule maintenance windows, and make the change. Once changes are made, they would need to monitor the components to see if the utilization levels evened out. DSS greatly simplifies this manual task and eliminates overloaded conditions.

This example security load distribution use case illustrates how DSS can handle an overloaded firewall.

1: DSS Manager Module 402 continuously monitors the network fabric and its components through Network Analytics Module 406. It understands periodic spikes vs. trends of higher utilization that lead to oversubscribed firewalls.

2: When a firewall's monitored resources reach upper threshold limits, DSS Manager Module 402 tracks the duration and the frequency with which this happens. Based on network load, firewall resources, security policy capacity, and/or other monitored parameters, DSS Manager Module 402 determines that an oversubscribed state is occurring on the firewall.

3: DSS Manager Module 402 compares the utilization trends of all security components under its management. It determines that an alternative firewall is underutilized and can handle more traffic than currently configured.

4: DSS Manager Module 402 calls Security Orchestration Modules 412 and 414 to obtain information from the oversubscribed firewall to get a better understanding of the most utilized security policies. It also analyzes the connections per second ("CPS"), bandwidth, and packet rate from the VXLAN ID (VNI) to understand how much traffic is sent from each VTEP and VNI.

5: It analyzes the collected information from multiple components and concludes that it can offload traffic from several VNIs on the overloaded firewall and reduce average utilization by 35% to bring the load back to an acceptable range. It also understands that moving these VNI traffic loads to the new firewall will not cause an overloaded situation on that firewall.

6: At a designated time as controlled by a policy defined on DSS Manager Module 402, DSS Manager Module 402 mirrors the security policies, objects, and profiles for the VNIs it would like to move from the overloaded firewall to the new firewall.

7: It confirms that the security policies are successfully deployed on the new firewall and the path to the new firewall is up and healthy.

8: At a designated time as controlled by a policy defined on DSS Manager Module 402, DSS Manager Module 402 calls Network Orchestration Module 408 and instructs it to reprogram the source and destination VTEPs for the VNIs it would like to move.

9: Network Orchestration Module 408 reprograms the leaf nodes (VTEPs) at the permitted time and starts forwarding the VNI's traffic to the new firewall. The original redirection configuration to the overloaded firewall is removed at the same time.

10. DSS Manager Module 402 continues to monitor the network and security components after the change to identify additional overloaded conditions.

3. Expanding Security Capacity Use Case

DSS can also be used to significantly reduce the complexity of adding security (e.g., firewall) capacity when there are no firewalls free to rebalance traffic loads. Without DSS, network and security administrators would need to manually add capacity and go through a long planning and rebalancing exercise.

This example use case shows how DSS can simplify security capacity increases.

1: DSS Manager Module 402 continuously monitors the security capacity for the network it is serving through statistics from Network Analytics Module 406.

2: DSS Manager Module 402 understands that traffic will exceed the combined firewall capacity and further rebalancing of the security load between managed firewalls will not help.

3: DSS Manager Module 402 proactively alerts an administrator through system log messages of the current capacity state and recommends capacity upgrades through the addition of new firewalls.

4. The administrator acknowledges the capacity state and orders new firewalls to increase security capacity for projected traffic growth.

5. New firewalls are physically installed in the data center and added to the security stacks (as service VTEPs).

6. The new firewalls join DSS Manager Module 402 through an authenticated bootstrap operation. After successful authentication, the firewalls join the stack(s). DSS Manager Module 402 sees the new firewalls, understands the new firewalls' capacity limits, and adds them to its inventory.

7: New firewalls are initialized with any additional configuration items as needed. For example, DSS Manager Module 402 can use Panorama's firewall configuration functionality to configure the new firewalls with common security objects, security policies used by all applications and hosts, etc.

8: New firewalls are burned in for a minimum duration to ensure stability.

9: DSS Manager Module 402 analyzes security loads and rebalances traffic to new firewalls as needed to remove oversubscribed conditions on existing firewalls (see Security Load Distribution Use Case above).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
in response to receiving an indication that a change associated with adjusting a capacity to provide security services to network traffic in a network environment needs to be made, determine, by the system, reconfiguration instructions comprising: a set of network device instructions for reconfiguring a network device and a set of security appliance instructions for reconfiguring a first security appliance, wherein the network device and the first security appliance are different types of devices, and wherein as a result of applying the respective reconfiguration instructions, either (1) an amount of network traffic provided by the network device to the first security appliance will increase, or (2) at least a portion of network traffic that would otherwise be provided by the network device to the first security appliance will instead be provided to a second security appliance; and
cause the network device to be reconfigured in accordance with the set of network device instructions and cause the first security appliance to be reconfigured in accordance with the set of security appliance instructions, including by using a plugin to translate an action into a vendor specific command; and
a memory coupled to the processor and configured to provide the processor with instructions.

2. The system of claim 1, wherein the indication is received in response to a provisioning of an application in the network environment.

3. The system of claim 1, wherein the indication is received in response to an overloading of a device.

4. The system of claim 1, wherein the reconfiguration instructions include instructions for rebalancing network fabric.

5. The system of claim 1, wherein the reconfiguration instructions include instructions for rebalancing a load on the first security appliance.

6. The system of claim 1, wherein the indication is received in response to the second security appliance joining the network environment.

7. The system of claim 1, wherein the indication is received in response to identification of a potential security threat from a node.

8. The system of claim 7, wherein the reconfiguration instructions cause traffic from the node to be dynamically redirected to the first security appliance for inspection.

9. The system of claim 1, wherein the first security appliance is connected in a service VTEP.

10. The system of claim 1, wherein the reconfiguration instructions comprise provisioning instructions.

11. The system of claim 1, wherein the reconfiguration instructions include instructions for redirecting a VXLAN tunnel.

12. A method, comprising:
in response to receiving an indication that a change associated with adjusting a capacity to provide security services to network traffic in a network environment needs to be made, determining, by a system, reconfiguration instructions comprising: a set of network device instructions for reconfiguring a network device and a set of security appliance instructions for reconfiguring a first security appliance, wherein the network device and the first security appliance are different types of devices, and wherein as a result of applying the respective reconfiguration instructions, either (1) an amount of network traffic provided by the network device to the first security appliance will increase, or (2) at least a portion of network traffic that would otherwise be provided by the network device to the first security appliance will instead be provided to a second security appliance; and
causing the network device to be reconfigured in accordance with the set of network device instructions and causing the first security appliance to be reconfigured in accordance with the set of security appliance instructions, including by using a plugin to translate an action into a vendor specific command.

13. The method of claim 12, wherein the indication is received in response to a provisioning of an application in the network environment.

14. The method of claim 12, wherein the indication is received in response to an overloading of a device.

15. The method of claim 12, wherein the indication is received in response to the second security appliance joining the network environment.

16. The method of claim 12, wherein the indication is received in response to identification of a potential security threat from a node.

17. The method of claim 12, wherein the first security appliance is connected in a service VTEP.

18. The method of claim 12, wherein the reconfiguration instructions include instructions for redirecting a VXLAN tunnel.

19. The method of claim 12, wherein the reconfiguration instructions include instructions for rebalancing network fabric.

20. The method of claim 12, wherein the reconfiguration instructions include instructions for rebalancing a load on the first security appliance.

21. The method of claim 16, wherein the reconfiguration instructions cause traffic from the node to be dynamically redirected to the first security appliance for inspection.

22. The method of claim 12, wherein the reconfiguration instructions comprise provisioning instructions.

* * * * *

UNITED STATES PATENT AND TRADEMARK OFFICE
CERTIFICATE OF CORRECTION

| | |
|---|---|
| PATENT NO. | : 11,252,192 B1 |
| APPLICATION NO. | : 16/370201 |
| DATED | : February 15, 2022 |
| INVENTOR(S) | : Philip Kwan and Sudeep Padiyar |

It is certified that error appears in the above-identified patent and that said Letters Patent is hereby corrected as shown below:

In the Specification

In Column 4, Line(s) 49, delete "platforms" and insert --platform)--, therefor.
In Column 13, Line(s) 47, after "Puppet", insert --,--.

Signed and Sealed this
Thirtieth Day of August, 2022

*Katherine Kelly Vidal*

Katherine Kelly Vidal
*Director of the United States Patent and Trademark Office*